US012812534B2

(12) United States Patent
Jung et al.

(10) Patent No.: US 12,812,534 B2
(45) Date of Patent: Nov. 24, 2026

(54) METHOD AND APPARATUS FOR PAGING OCCASING MANAGEMENT OF NETWORK ENERGY SAVING (NES) CELL IN THE NEXT GENERATION MOBILE COMMUNICATION SYSTEM

(71) Applicant: Samsung Electronics Co., Ltd., Suwon-si (KR)

(72) Inventors: Byounghoon Jung, Suwon-si (KR); Anil Agiwal, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 18/437,181

(22) Filed: Feb. 8, 2024

(65) Prior Publication Data

US 2024/0276375 A1 Aug. 15, 2024

(30) Foreign Application Priority Data

Feb. 10, 2023 (KR) ........................ 10-2023-0017873

(51) Int. Cl.
*H04W 52/02* (2009.01)
*H04W 4/90* (2018.01)
*H04W 68/00* (2009.01)

(52) U.S. Cl.
CPC ......... *H04W 52/0229* (2013.01); *H04W 4/90* (2018.02); *H04W 68/005* (2013.01)

(58) Field of Classification Search
CPC . H04W 52/0229; H04W 4/90; H04W 68/005; H04W 52/0235; H04W 76/50; H04W 68/02; H04W 52/0206; H04W 76/28; Y02D 30/70
See application file for complete search history.

(56) References Cited

U.S. PATENT DOCUMENTS

| | | | | |
|---|---|---|---|---|
| 8,914,048 | B2 | 12/2014 | Montojo et al. | |
| 2021/0051583 | A1 | 2/2021 | Shikari et al. | |
| 2021/0235252 | A1 | 7/2021 | Shikari et al. | |
| 2022/0046403 | A1* | 2/2022 | He | H04W 4/12 |
| 2023/0043139 | A1 | 2/2023 | Hwang et al. | |
| 2024/0107450 | A1* | 3/2024 | Wei | H04W 52/028 |
| 2025/0254755 | A1* | 8/2025 | Fu | H04L 27/00 |

(Continued)

FOREIGN PATENT DOCUMENTS

| | | | |
|---|---|---|---|
| CN | 114980287 | A | 8/2022 |
| EP | 4572425 | A1 * | 6/2025 |
| WO | 2022179914 | A1 | 9/2022 |

OTHER PUBLICATIONS

3GPP TR 38.864 V18.0.0 (Dec. 2022) Technical Report; 3rd Generation Partnership Project; Technical Specification Group Radio Access Network; Study on network energy savings for NR (Release 18); 71 pages.

(Continued)

*Primary Examiner* — Ayaz R Sheikh
*Assistant Examiner* — Mang Boi Thawng

(57) ABSTRACT

The disclosure relates to a 5G or 6G communication system for supporting a higher data transmission rate. According to the disclosure, even in case of operating in a network energy saving (NES) mode, when an emergency event occurs, a base station can efficiently transmit an emergency signal to a terminal.

18 Claims, 11 Drawing Sheets

(56) References Cited

U.S. PATENT DOCUMENTS

| | | | | |
|---|---|---|---|---|
| 2026/0040395 A1* | 2/2026 | Myung | ................. | H04W 76/28 |
| 2026/0089622 A1* | 3/2026 | Cheng | ................... | H04W 48/20 |

OTHER PUBLICATIONS

International Search Report and Written Opinion of the International Searching Authority dated May 9, 2024, in connection with International Application No. PCT/KR2024/001882, 8 pages.

LG Electronics, "Discussion on physical layer techniques for network energy savings," R1-2212302, 3GPP TSG RAN WG1 #111, Toulouse, France, Nov. 14-18, 2022, 23 pages.

Supplementary European Search Report dated Feb. 5, 2026, in connection with European Patent Application No. 24753654.3, 8 pages.

* cited by examiner

METHOD AND APPARATUS FOR PAGING OCCASING MANAGEMENT OF NETWORK ENERGY SAVING (NES) CELL IN THE NEXT GENERATION MOBILE COMMUNICATION SYSTEM

CROSS REFERENCE TO RELATED APPLICATION

The present application claims priority to Korean Patent Application No. 10-2023-0017873, filed Feb. 10, 2023, the entire contents of which is incorporated herein for all purposes by this reference.

BACKGROUND

1. Field

The disclosure relates to operations of a terminal and base station in a wireless communication system, and particularly to a method and apparatus for transmitting and receiving emergency signals between a terminal and a base station in case of operating in a network energy saving (NES) mode.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Meanwhile, even in case of operating in a network energy saving (NES) mode, a need for a method for a base station to transmit an emergency signal to a terminal when an emergency event occurs has emerged.

SUMMARY

An object of the disclosure is to provide a method and apparatus for efficiently transmitting emergency signals from a base station to a terminal when an emergency event occurs even in case of operating in a network energy saving (NES) mode.

Accordingly, the embodiments herein provide a method performed by a base station in a wireless network. The method includes transmitting, to a terminal, a message including configuration information for transmitting an emergency signal associated with a network energy saving (NES) mode, determining whether a predetermined emergency event is detected during an NES active period in case that a cell operates in the NES mode, and transmitting, to the terminal, the emergency signal based on a determination that the predetermined emergency event is detected.

Accordingly, the embodiments herein provide a base station in a wireless network. The base station includes a transceiver; and at least one processor operably coupled to the transceiver, the at least one processor configured to: transmit, to a terminal via the transceiver, a message including configuration information for transmitting an emergency signal associated with a network energy saving (NES) mode, determine whether a predetermined emergency event is detected during an NES active period in case that a cell operates in the NES mode, and transmit, to the terminal via the transceiver, the emergency signal based on a determination that the predetermined emergency event is detected.

According to an embodiment of the disclosure, even in case of operating in a network energy saving (NES) mode, when an emergency event occurs, the base station may efficiently transmit an emergency signal to the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
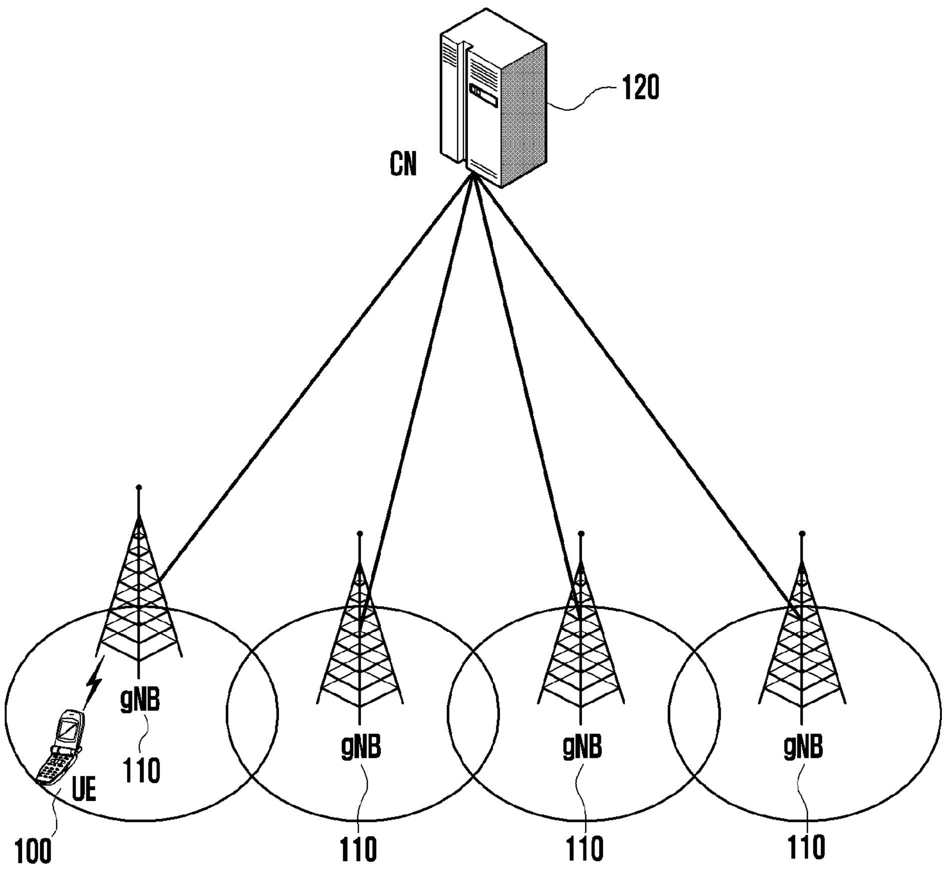
FIG. 1 illustrates a structure of an NR system according to an embodiment of the disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an operation principle of the disclosure is described in detail with reference to the accompanying drawings. In describing the disclosure, a detailed description of a related known function or configuration will be omitted in case where it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

In the following description, a base station is a subject for performing allocation of a resource for a terminal, and may be at least one of a gNode B, an eNode B, a Node B, a base station (BS), a wireless access unit, a base station controller, and a network node. A terminal may include a user equipment (UE), a mobile station (MS), a cellular phone, a smart phone, a computer, or a multimedia system capable of performing a communication function. In the disclosure, a downlink (DL) is a wireless transmission path through which a BS transmits a signal to a terminal, and an uplink (UL) is a wireless transmission path through which a terminal transmits a signal to a BS. Further, embodiments of the disclosure are discussed as an example of an LTE or LTE-A system. However, the embodiments of the disclosure may be applied to other communication systems having similar technical backgrounds or channel types. For example, the 5th generation mobile communication technology (5G, new radio, NR) developed since LTE-A may be included in a system to which an embodiment of the disclosure can be applied. 5G as herein used may also be a concept including the existing LTE, LTE-A, and other similar services. Further, embodiments of the disclosure may be applied to other communication systems with some modifications to such an extent that does not significantly deviate from the scope of the disclosure when determined by those skilled in the art. Here, it will be understood that each blocks and combination of the blocks of a flowchart may be performed by computer program instructions.

The computer program instructions can be provided to a processor of a general purpose computer, special purpose computer, or other programmable data processing apparatus, such that the instructions, which execute via the processor of the computer or other programmable data processing apparatus, create a means for implementing the functions specified in the block(s) of flowchart. The computer program instructions may also be stored in a computer usable or computer-readable memory that may direct a computer or other programmable data processing apparatus to function in a particular manner, such that the instructions stored in the computer usable or computer-readable memory may produce an article of manufacture including an instruction means that implements the function specified in the flowchart block(s). The computer program instructions may also be loaded onto a computer or other programmable data processing apparatus to cause a series of operational steps to be performed on the computer or other programmable apparatus to produce a computer implemented process such that the instructions executing the computer or other programmable data processing apparatus provide steps for implementing the functions specified in the flowchart block (s).

Further, each block may represent a module, segment, or portion of code, which includes one or more executable instructions for implementing the specified logical function (s). Further, in some alternative implementations, it should be noted that the functions specified in the blocks may occur out of order. For example, two blocks shown in succession may in fact be executed at or about the same time, or the blocks may sometimes be executed in reverse order, depending upon the functionality involved. As used herein, the term "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, elements such as software elements, object-oriented software elements, class elements and task elements, processes, functions, properties, procedures, sub-routines, segments of a program code, drivers, firmware, micro-codes, circuits, data, database, data structures, tables, arrays, and parameters. The functions provided for in the elements and "units" may be combined into a smaller number of elements and "units," or further separated into additional elements and "units." Moreover, the elements and "units" may be implemented to reproduce one or more CPUs within a device or a security multimedia card. Further, in an embodiment, a "unit" may include at least one processor.

For ease of description, the disclosure uses terms and names defined in the 5GS and NR standards, which are standards defined by the 3rd generation partnership project (3GPP) organization among currently existing communication standards. However, the disclosure is not limited by such terms and names and may be likewise applicable to wireless communication networks conforming to other standards. For example, the disclosure may be applied to 3GPP 5GS/NR (5th generation mobile communication standards).

FIG. 1 illustrates a structure of an NR system according to an embodiment of the disclosure.

With reference to FIG. 1, as illustrated, a wireless access network of an NR system may include a next-generation base station (g Node B, hereinafter referred to as gNB, Node B or base station) 110 and a core network (CN) 120. A user terminal (terminal or user equipment, hereinafter referred to as UE) 100 or terminal may access an external network through the gNB and CN.

In FIG. 1, the gNB 110 corresponds to the existing Node B of an UMTS system or existing enhanced node B (ENB) of an LTE system. The gNB is connected to the UE through a wireless channel and may perform a more complex function than the existing ENB. In the NR system, because all user traffic including real-time services such as voice over IP (VoIP) through the Internet protocol is serviced through a shared channel, an apparatus for collecting and scheduling state information such as UEs' buffer states, available transmission power states, channel states and the like may be required, which may be managed by the gNB 110. The gNB 110 may generally control a plurality of cells. For example, in order to implement a transmission rate of 100 Mbps, the NR system may use orthogonal frequency division multiplexing (OFDM) in a 20 MHz bandwidth as a wireless access technology. Also, an adaptive modulation & coding (AMC) scheme may be applied to determine a modulation scheme and a channel coding rate according to the channel state of a terminal.

The NR CN 120 may perform functions such as mobility support, bearer configuration, and QoS configuration. The CN 120 may be a device for managing various control functions as well as a mobility management function for the UE 100 and may be connected to a plurality of base stations 110. Also, the next-generation mobile communication system may also be linked with the existing LTE system, and the CN may be connected to the MME through a network interface. The MME may be connected to an eNB that is an existing base station.

Figure 2:
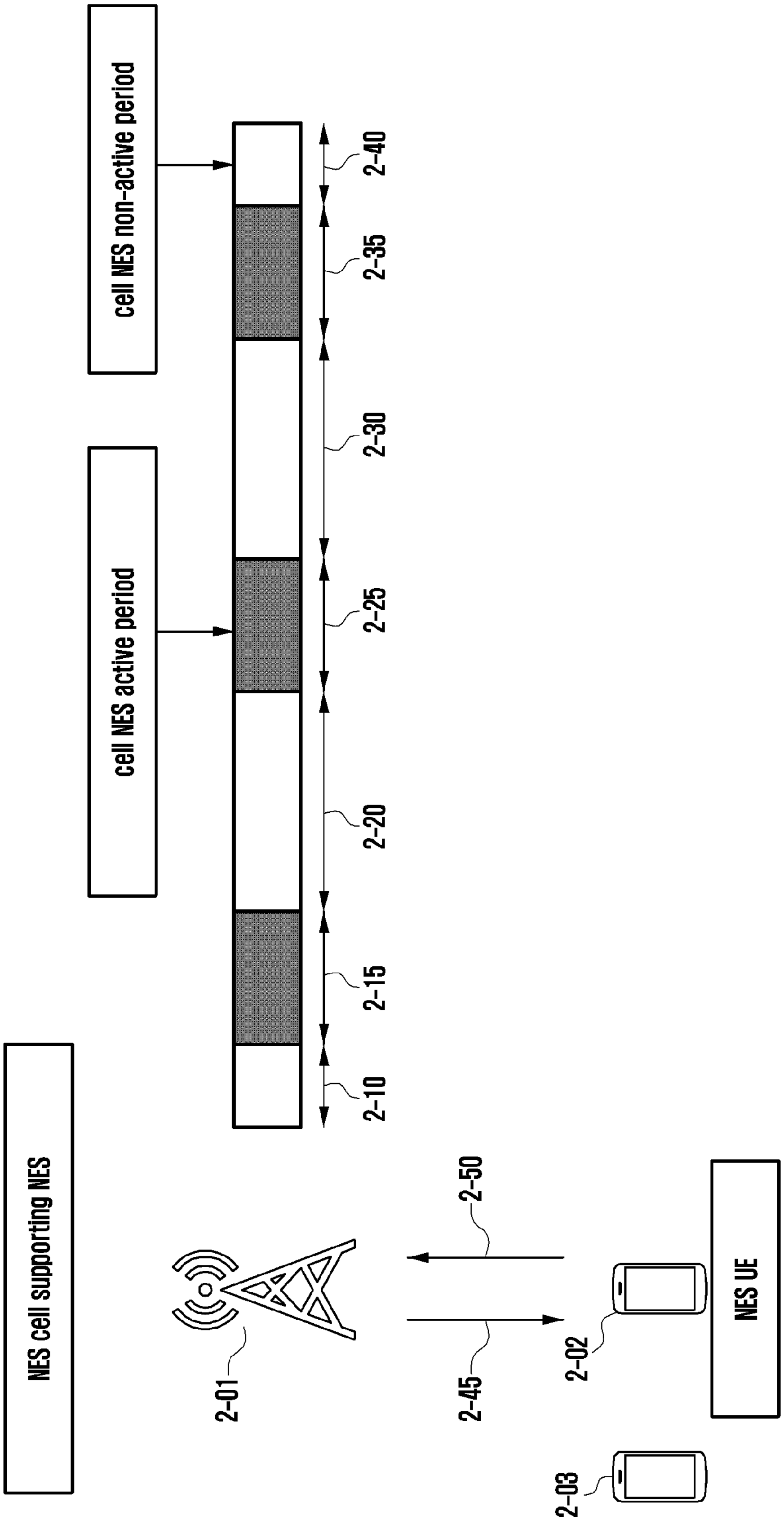
FIG. 2 illustrates an NES mode or cell DTX/cell DRX of a base station or cell according to an embodiment of the disclosure.

FIG. 2 illustrates a concept of an NES mode or cell discontinuous transmission (DTX)/cell discontinuous reception (DRX) of a base station or cell according to an embodiment of the disclosure.

A network energy saving (NES) cell 2-01 supporting cell DTX/DRX may transmit and/or receive signals only during a specific period for the purpose of saving power consumption of a network equipment. For example, the NES cell 2-01 may transmit a signal (2-45) in the cell DTX/DRX active period (2-15, 2-25, 2-35), and receive a signal from the NES UE 2-02 (2-50). According to an embodiment, the NES cell 2-01 may neither transmit a signal nor receive a signal from the UE in the cell DTX/DRX non-active period (2-10, 2-20, 2-30, 2-40). The NES cell 2-01 may broadcast an indication indicating support for the cell DTX/DRX function using/based on system information (e.g., MIB or SIB1). The NES cell 2-01 may activate the cell DTX/DRX according to a specific pattern, and information about the specific pattern may be broadcast in the system information. For example, the NES cell 2-01 may broadcast a periodicity for the cell DTX/DRX active period, a start slot/offset indicating a starting point, a cell DTX/DRX active period (on duration), etc. in system information. Accordingly, the NES UE 2-02 may synchronize with the NES cell 2-01, measure the NES cell, camp on the NES cell, or reselect the NES cell.

The NES terminal 2-02 according to an embodiment of the disclosure provides measuring surrounding cells before the cell DTX/DRX non-active period, even if a serving cell satisfies the following: Srxlev>SIntraSearchP and Squal>SIntraSearchQ or Srxlev>SnonIntraSearchP and Squal>SnonIntraSearchQ. When the NES cell 2-01 enters the cell DRX/DRX non-active period, the NES UE 2-02 may no longer transmit or receive signals from a corresponding cell, so the corresponding cell measures surrounding cells before the cell DTX/DRX non-active period, allowing to reselect a cell.

For reference, in the case of a general UE 2-03, the NES cell 2-01 may be barred. For example, the general UE 2-03 may be barred so as not to (re)select the NES cell 2-01 through the information stored in the MIB broadcast by the NES cell 2-01.

Figure 3:
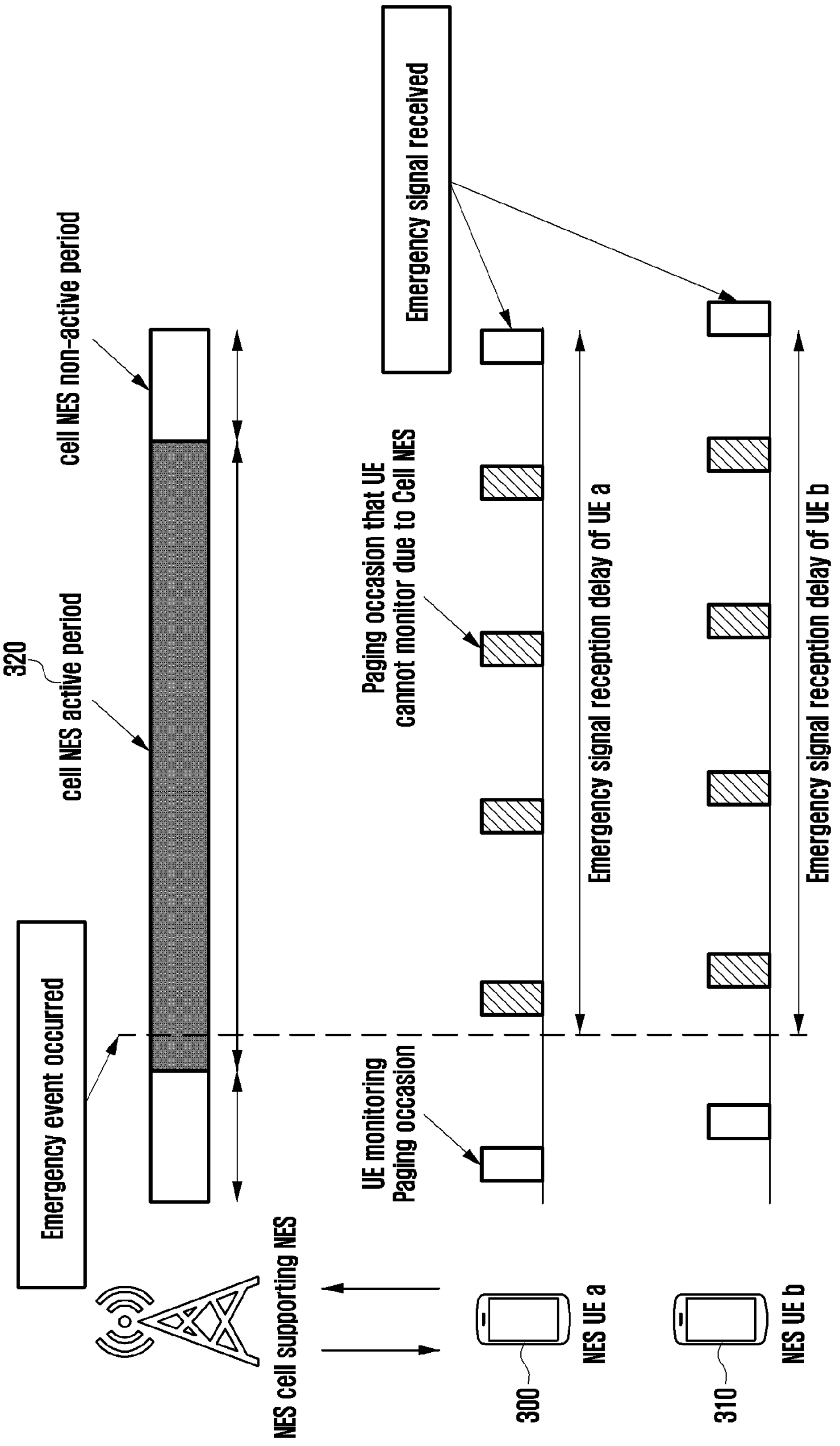
FIG. 3 illustrates an operation in case where an NES mode or cell DTX/cell DRX of a base station or cell and a paging signal reception section (paging occasion, hereinafter referred to as PO) of a UE in an IDLE mode overlap according to an embodiment of the disclosure.

FIG. 3 illustrates an operation in case where an NES mode or cell discontinuous transmission (DTX)/cell discontinuous reception (DRX) of a base station or cell and a paging signal reception section (paging occasion, hereinafter referred to as PO) of a UE in an IDLE mode overlap, according to an embodiment of the disclosure.

In the figure, an NES UE a 300 and NES UE b 310 have POs that are periodically repeated. The POs may overlap with a cell NES active period (320) in case where the base station turns on a cell NES mode. During this overlap, the base station operates in an NES mode and may not transmit paging signals. Accordingly, during the overlapping time, the UEs 300 and 310 may not receive a paging signal even if they observe (or monitor) the PO. In this case, as illustrated in FIG. 3, in case where an emergency event that requires transmitting an emergency signal occurs while the base station is operating in the NES mode according to an embodiment of the disclosure, the corresponding signal cannot be transmitted to the UE until the base station deactivates the NES mode, so there is a problem that a long delay may occur until the UE receives the emergency signal.

Figure 4:
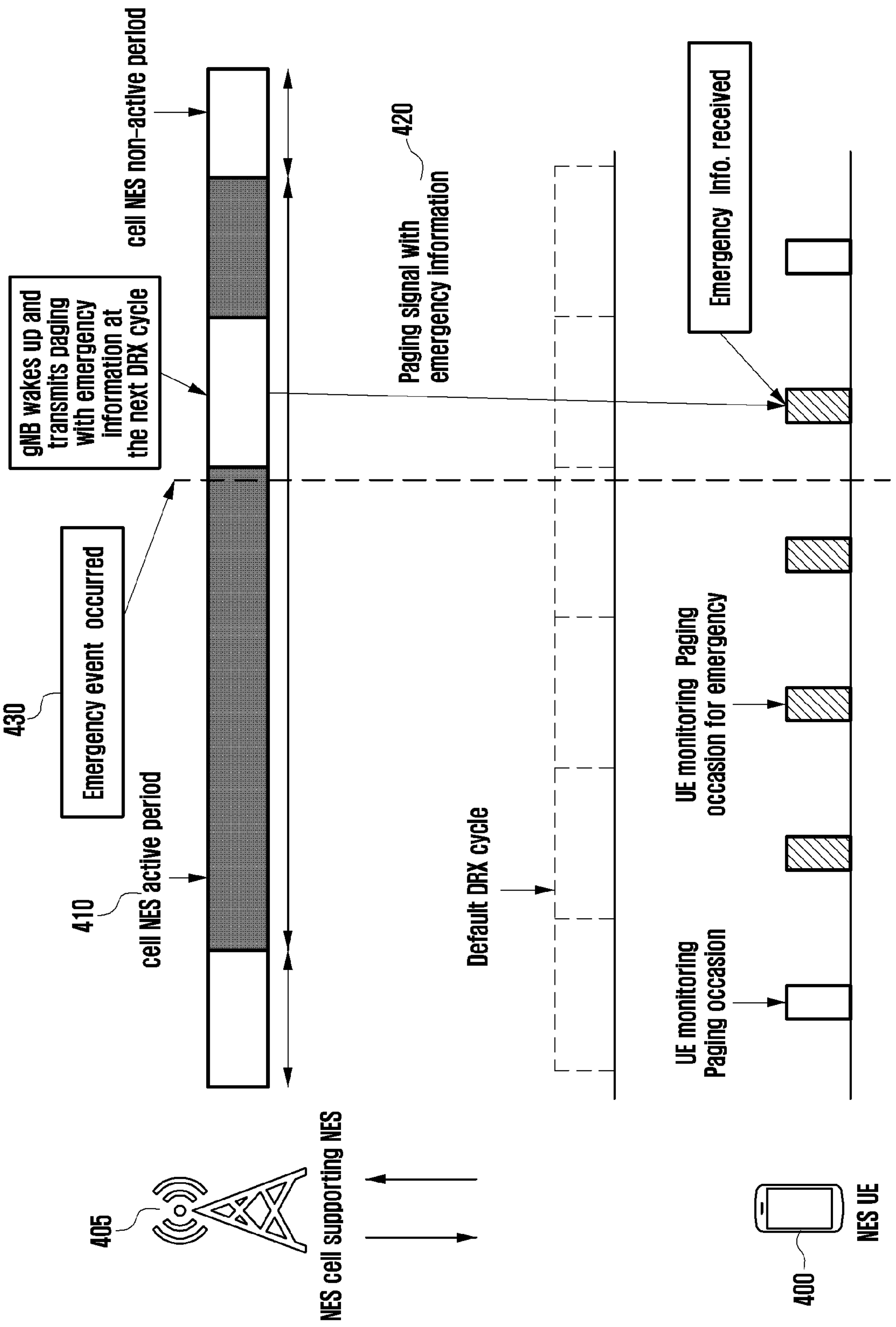
FIG. 4 illustrates a method for transmitting an emergency signal in a NES cell according to an embodiment of the disclosure.

Meanwhile, FIG. 4 is a diagram illustrating a wake up method of an NES cell for transmitting an emergency signal, according to an embodiment of the disclosure. With reference to FIG. 4, the UE 400 may not stop monitoring the PO for receiving the emergency message even if the base station 405 operates in an NES mode. In this case, the UE 400 may monitor the emergency signal transmitted by the base station 405 in the PO selected as a result of the calculation through a certain formula, which is selected by the UE 400 or configured in advance by the UE 400 and base station 405 within one default DRX cycle, based on the default DRX cycle configured in advance by the base station 405. In this case, the base station 405 may also know information about the default DRX Cycle.

As described above, in case where the cell NES mode is turned on, the PO and cell NES active period (410) may overlap. During this overlap, the base station 405 operates in the NES mode and may not transmit a paging signal. In this case, during the overlapping time, the UE 400 may not receive paging even if the UE observes the PO. However, the UE 400 may monitor the PO for emergency during the cell NES active period (410).

According to an embodiment of the disclosure, in FIG. 4, even in case where the base station 405 is operating in the NES mode, when an emergency event occurs (430) and it is necessary to send an emergency signal to the UEs, the base station 405 may recognize this. For example, the base station 405 may be able to receive corresponding information (e.g., information associated with the occurrence of an emergency event) from a core network even when operating in the NES mode, and the communication module connected to the core network may not be turned off in order to receive the above corresponding information. When the base station 405 recognizes that an emergency event occurs while operating in the NES mode and that an emergency signal needs to be sent to the UEs, the base station 405 wakes up and transmits the corresponding emergency signal 420 to the UEs during the default DRX cycle immediately following. It is apparent that the emergency signal 420 may be transmitted to the UE in the form of short data included in the paging signal, or may be transmitted as a separate signal following the paging signal. The emergency signal 420 may be any signal including emergency information. In this way, when the base station 405 needs to transmit an emergency signal to the UEs, the base station wakes up immediately and transmits the emergency signal to the UEs, thereby enabling the UEs to receive the emergency signal without delay.

The base station 405 may configure the DRX cycle, which is a period in which the UE 400 receives the paging occasion even after the base station 405 enters the NES mode to receive an emergency signal, to a certain default DRX cycle, and the corresponding DRX cycle may be configured in the following form.

The default DRX cycle may be a new type of DRX cycle that is configured directly to have a certain period value (e.g., 20 ms) from a certain reference point, for example, SFN0 or SFN where the NES mode starts.

The default DRX cycle may be configured with an existing DRX Cycle indication and multiple to have a certain multiple of the existing DRX cycle.

The default DRX cycle may be configured and operated so that the UE attempts reception only in part of a certain existing DRX cycle. For example, the default DRX cycle may be configured and operated so that the UE receive in a DRX cycle that is counted from a DRX cycle starting at SFN0 or from a DRX cycle where the NES mode starts and multiplies even, odd, or a certain constant configured by the base station, for example, in a DRX Cycle in multiples of 3 if the base station configures 3.

In an embodiment, the base station 405 may transmit an emergency signal to the UE 400 and then return to the NES mode to save power.

In another embodiment, the base station 405 may wake up after transmitting an emergency signal to the UE 400 and operate in an NES non-active mode.

Figure 5:
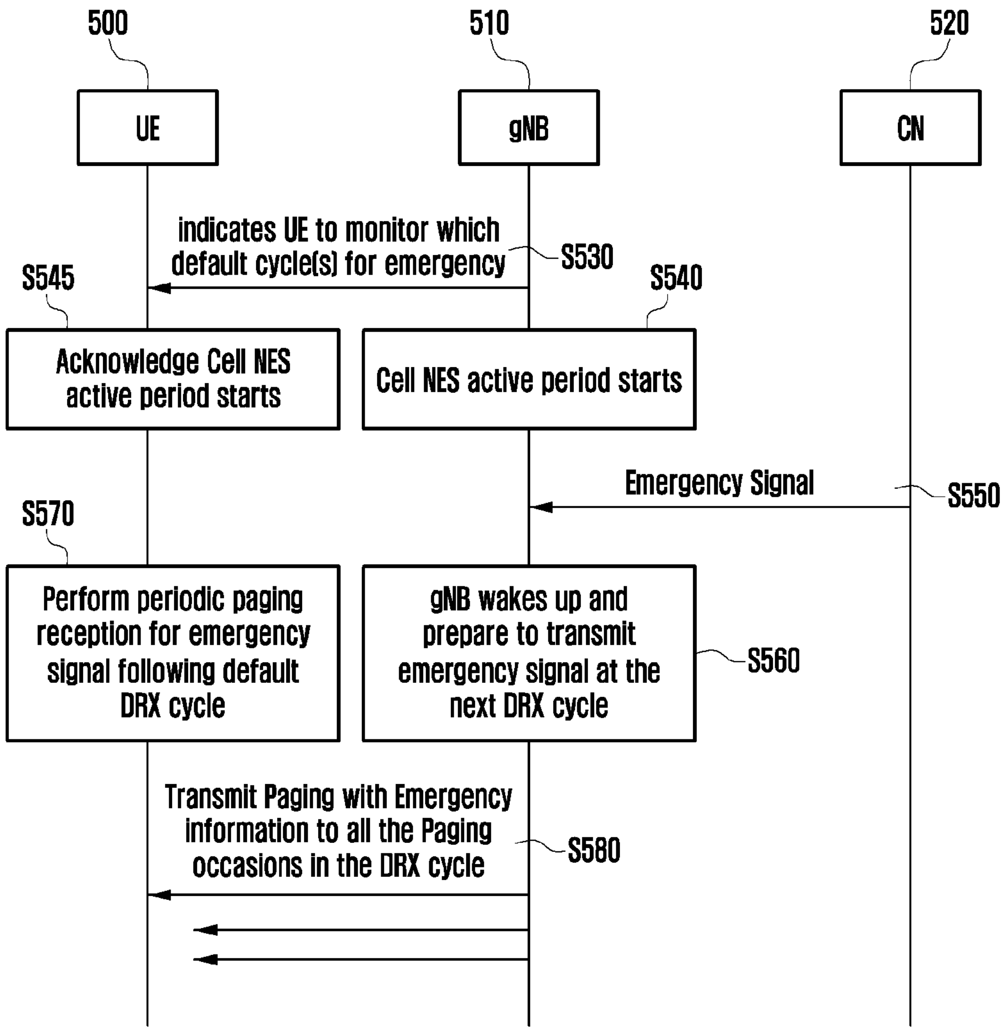
FIG. 5 illustrates operations of a terminal and base station according to an embodiment of the disclosure.

FIG. 5 illustrates operations of a terminal and base station according to an embodiment of the disclosure.

In operation S530, in case where a base station 510 operates in an NES mode, the base station 510 may configure in advance a UE 500 supporting emergency signal reception as to which a paging occasion may be used to receive an emergency signal. A corresponding configuration message may be transmitted by being included in any signal sent from the base station 510 to the UE 500, such as an RRC message, MAC message, or SIB message. The base station 510 may configure the DRX cycle, which is the period in which the UE 500 receives the paging occasion to receive an emergency signal even after the base station 510 enters the NES mode, to a certain default DRX cycle, and the corresponding DRX cycle may be configured in the following form.

The default DRX cycle may be a new type of DRX cycle that is configured directly to have a certain period value (e.g., 20 ms) from a certain reference point, for example, SFN0 or SFN where the NES mode starts.

The default DRX cycle may be configured with an existing DRX Cycle indication and multiple to have a certain multiple of the existing DRX cycle.

The default DRX cycle may be configured and operated so that the UE attempts reception only in part of a certain existing DRX cycle. For example, the default DRX cycle may be configured and operated so that the UE receive in a DRX cycle that is counted from a DRX cycle starting at SFN0 or from a DRX cycle where the NES mode starts and multiplies even, odd, or a certain constant configured by the base station, for example, in a DRX Cycle in multiples of 3 if the base station configures 3.

In operation S540, the base station 510 may operate in the NES mode. In addition, in operation S545, the UE 500 may recognize the start of the NES mode operation.

The UE 500 may monitor the emergency signal transmitted by the base station 510 in the PO selected as a result of the calculation through a certain formula, which is selected by the UE 500 or configured in advance by the UE 500 and base station 510 within one default DRX cycle, based on the default DRX Cycle configured in advance by the base station 510.

In case where an emergency event occurs while operating in the NES mode, the base station 510 may receive an emergency signal from a core network 520 (Operation S550). In operation S560, the base station 510 may recognize the need to send an emergency signal to the UE 500 and wake up. Further, the base station 510 may prepare to transmit an emergency signal in the next DRX cycle. In operation S570, the UE 500 may perform periodic paging reception for an emergency signal during a next default DRX cycle. Further, in operation S580, the base station 510 may transmit paging including emergency information to the UE 500.

For example, the base station 510 wakes up to transmit an emergency signal and may then transmit the corresponding emergency signal to the UE 500 during the default DRX cycle. It is apparent that the emergency signal may be transmitted to the UE in the form of short data included in the paging signal, or may be transmitted as a separate signal following the paging signal. The emergency signal 420 may be any signal including emergency information. In this way, when the base station 510 needs to transmit an emergency signal to the UE, the base station wakes up immediately and transmits the emergency signal to the UE 500, thereby enabling the UE 500 to receive the emergency signal without delay.

In an embodiment, the base station 510 may transmit an emergency signal to the UE 500 and then return to the NES mode to save power.

In another embodiment, the base station 510 may wake up after transmitting an emergency signal to the UE 500 and operate in an NES non-active mode.

Figure 6:
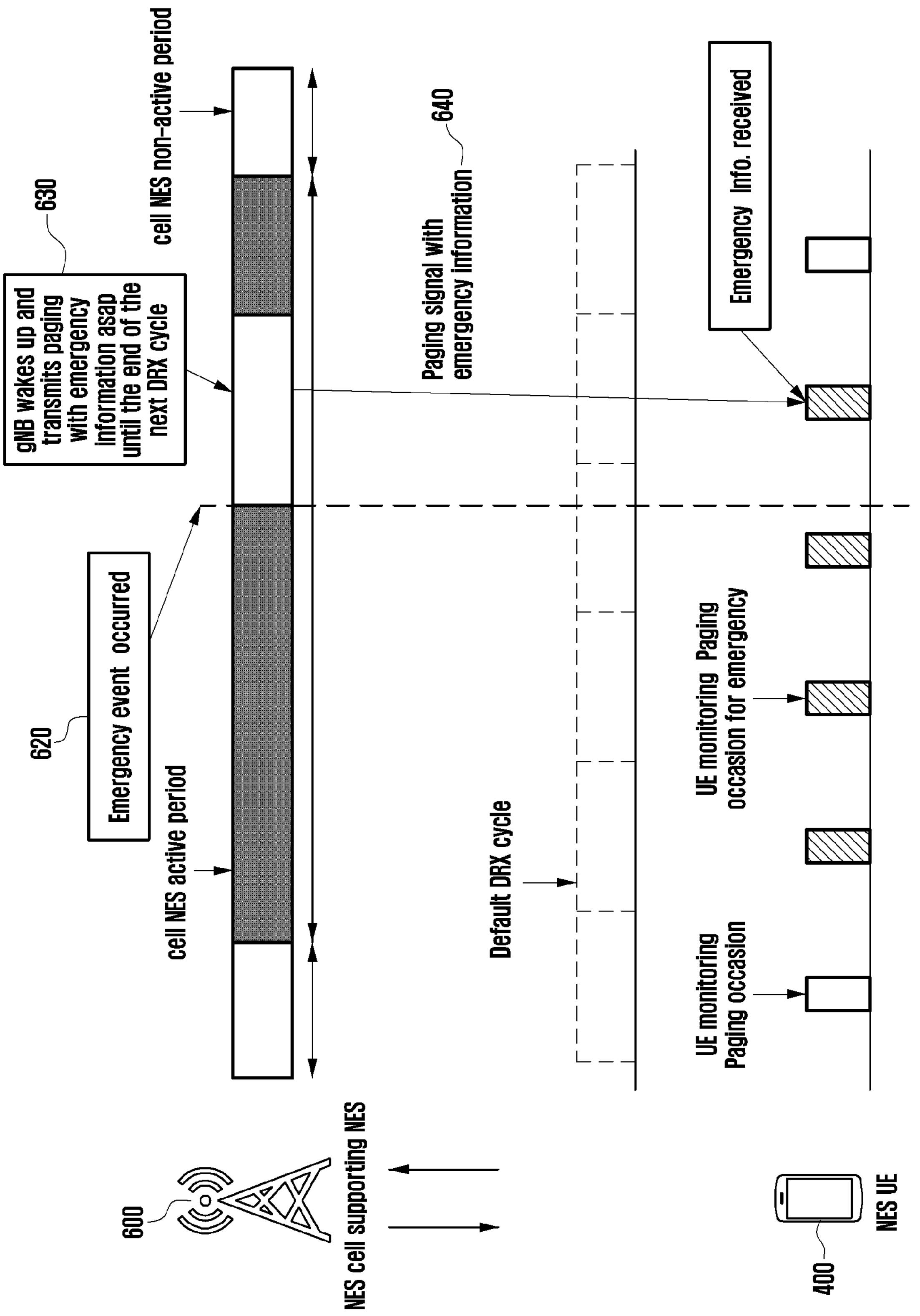
FIG. 6 illustrates a method for transmitting an emergency signal in a NES cell according to another embodiment of the disclosure.

Meanwhile, FIG. 6 is a diagram illustrating a method for transmitting an emergency signal in an NES cell according to another embodiment of the disclosure. In FIG. 6, a base station 600 may recognize when an emergency event occurs and it is necessary to send an emergency signal to a UE 610 even in case where the base station 600 is operating in an NES mode. For example, the base station 600 may be able to receive information about the occurrence of the emergency signal from a core network even when operating in the NES mode, and for this, the communication module connected to the core network may not be turned off. If an emergency event occurs while operating in the NES mode (620) and the base station 600 recognizes the need to send an emergency signal to the UE 610, the base station may start transmitting an emergency signal 640 as soon as the UE wakes up (630). The emergency signal 640 may be continuously transmitted even during the default DRX cycle that arrives after transmission begins. According to the embodiment illustrated in FIG. 6, the base station 600 is able to transmit the corresponding emergency signal to the UEs more quickly than the embodiment illustrated in FIG. 4. It is apparent that the emergency signal 640 may be transmitted to the UE 610 in the form of short data included in the paging signal, or may be transmitted as a separate signal following the paging signal. The emergency signal 640 may be any signal including emergency information. In this way, when it is necessary to transmit an emergency signal to the UE 610, the base station 600 wakes up immediately and transmits the emergency signal, thereby enabling the UE 610 to receive the emergency signal without delay.

In an embodiment, the base station 600 may transmit an emergency signal to the UE 610 and then return to the NES mode to save power.

In another embodiment, the base station 600 may wake up after transmitting an emergency signal to the UE 610 and operate in an NES non-active mode.

Figure 7:
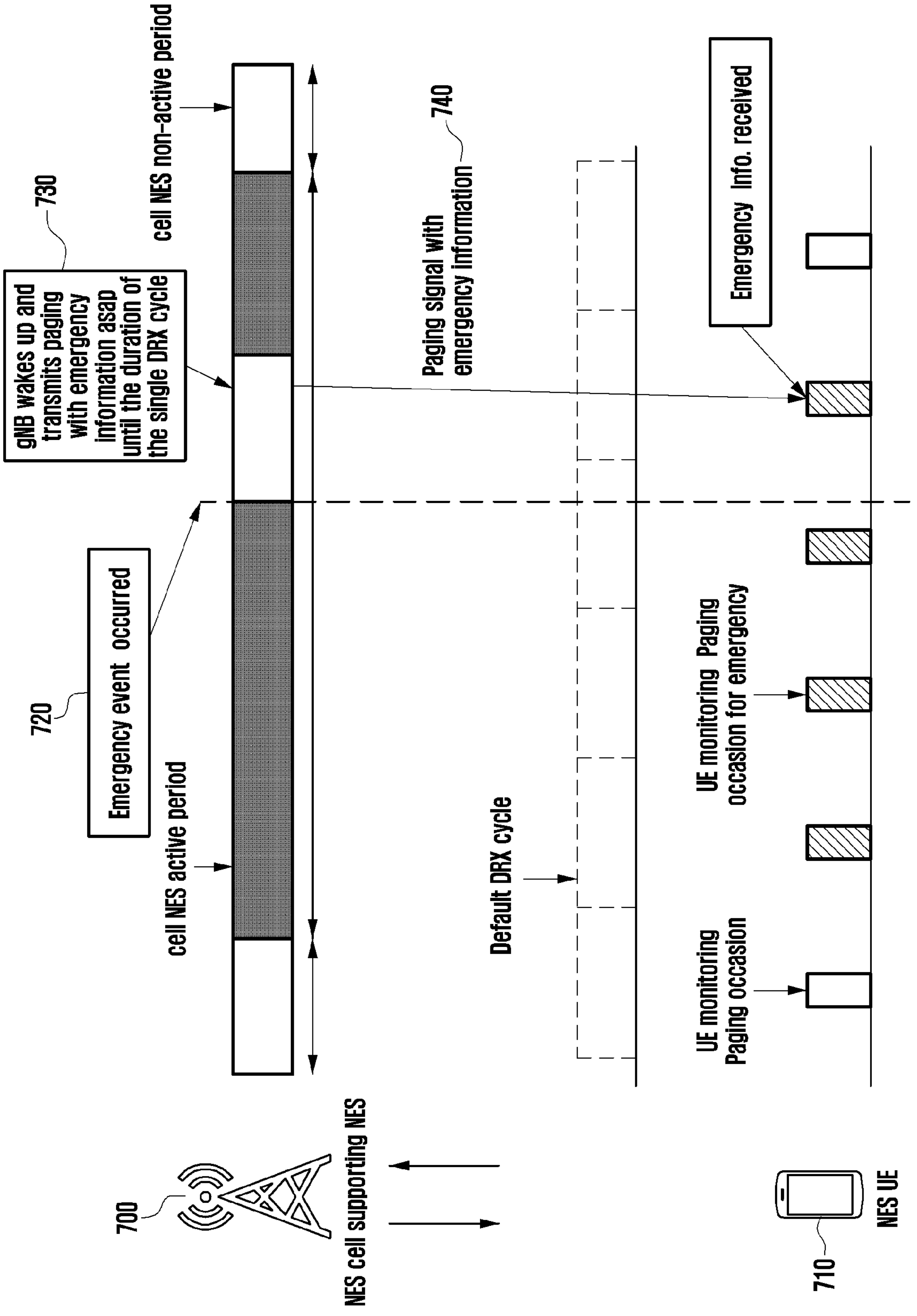
FIG. 7 illustrates a method for transmitting an emergency signal in a NES cell according to another embodiment of the disclosure.

FIG. 7 illustrates a method for transmitting an emergency signal in a NES cell according to another embodiment of the disclosure. In FIG. 7, a base station 700 may recognize when an emergency event occurs and it is necessary to send an emergency signal to a UE 710 even in case where the base station 700 is operating in an NES mode. For example, the base station 700 may be able to receive information about the occurrence of the emergency signal from a core network even when operating in the NES mode, and for this, the communication module connected to the core network may not be turned off. If an emergency event occurs while operating in the NES mode (720) and the base station 700 recognizes the need to send an emergency signal to the UE 710, the base station may start transmitting an emergency signal 740 as soon as the UE wakes up (730). Further, the base station 700 transmits an emergency signal during the DRX cycle.

In the embodiment illustrated in FIG. 7, the base station 700 may transmit an emergency signal without necessarily in the default DRX cycle (for example, without waiting). Accordingly, the base station 700 may transmit the corresponding emergency signal to the UEs more quickly than in the embodiment illustrated in FIG. 4 and may save power of the base station by avoiding unnecessary retransmission compared to the embodiment illustrated in FIG. 6. It is apparent that the emergency signal 740 may be transmitted to the UE in the form of short data included in the paging signal or may be transmitted as a separate signal following the paging signal. The emergency signal 740 may be any signal including emergency information. In this way, when it is necessary to transmit an emergency signal to the UE 710, the base station 700 wakes up immediately and transmits the emergency signal, thereby enabling the UE 710 to receive the emergency signal without delay.

In an embodiment, the base station 700 may transmit an emergency signal to the UE 710 and then return to the NES mode to save power.

In another embodiment, the base station 700 may wake up after transmitting an emergency signal to the UE 710 and operate in an NES non-active mode.

Figure 8:
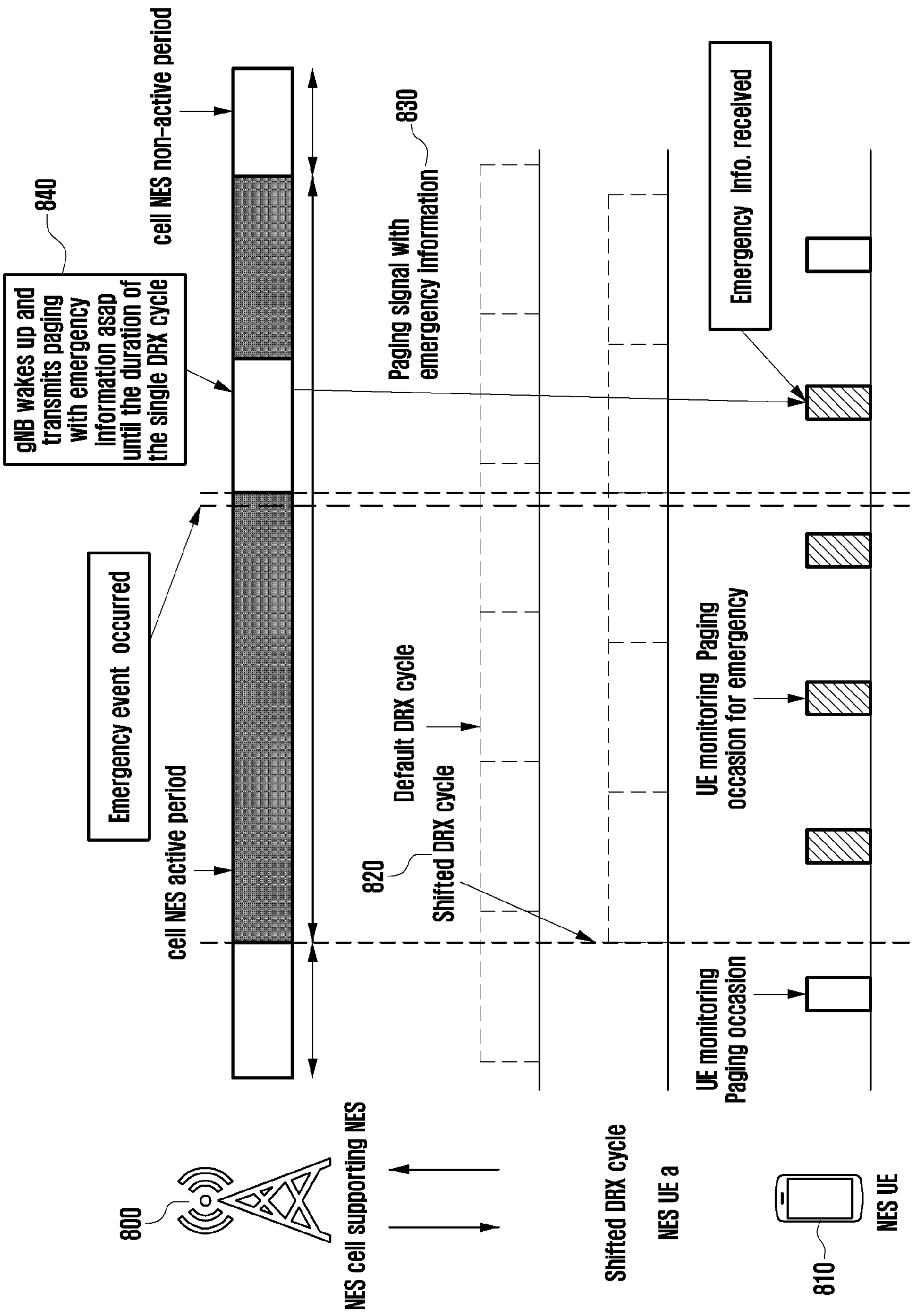
FIG. 8 illustrates a method for transmitting an emergency signal in a NES cell according to another embodiment of the disclosure.

Meanwhile, FIG. 8 illustrates a method for transmitting an emergency signal in a NES cell according to another embodiment of the disclosure. In FIG. 8, a base station 800 may recognize when an emergency event occurs and it is necessary to send an emergency signal to a UE 810 even in case where the base station 800 is operating in an NES mode. For example, the base station 800 may be able to receive information about the occurrence of the emergency signal from a core network even when operating in the NES mode, and for this, a communication module connected to the core network may not be turned off.

According to the embodiment illustrated in FIG. 8, the base station 800 generates a new periodic DRX cycle from the start of NES mode operation, for example, operates with a shifted default DRX cycle. The UE 810 may also recognize the NES mode operation time of the base station 800, recognize this shifted default DRX cycle, and operate using/following/based on the shifted DRX cycle. When the base station 800 recognizes that an emergency event occurs while operating in the NES mode and it is necessary to send an emergency signal to the UE 810, the base station starts transmitting an emergency signal 830 as soon as the UE wakes up, and the base station 800 may transmit the emergency signal 830 during the shifted default DRX cycle (840). It is apparent that the emergency signal 830 may be transmitted to the UE 810 in the form of short data included in the paging signal or may be transmitted as a separate signal following the paging signal. The emergency signal 830 may be any signal including emergency information. In this way, when the base station 800 needs to transmit an emergency signal to the UE 810, the base station wakes up immediately and transmits the emergency signal, so that the UE 810 may receive the emergency signal without delay.

In an embodiment, the base station 800 may transmit an emergency signal to the UE 810 and then return to the NES mode to save power.

In another embodiment, the base station 800 may wake up after transmitting an emergency signal to the UE 810 and operate in an NES non-active mode.

Figure 9:
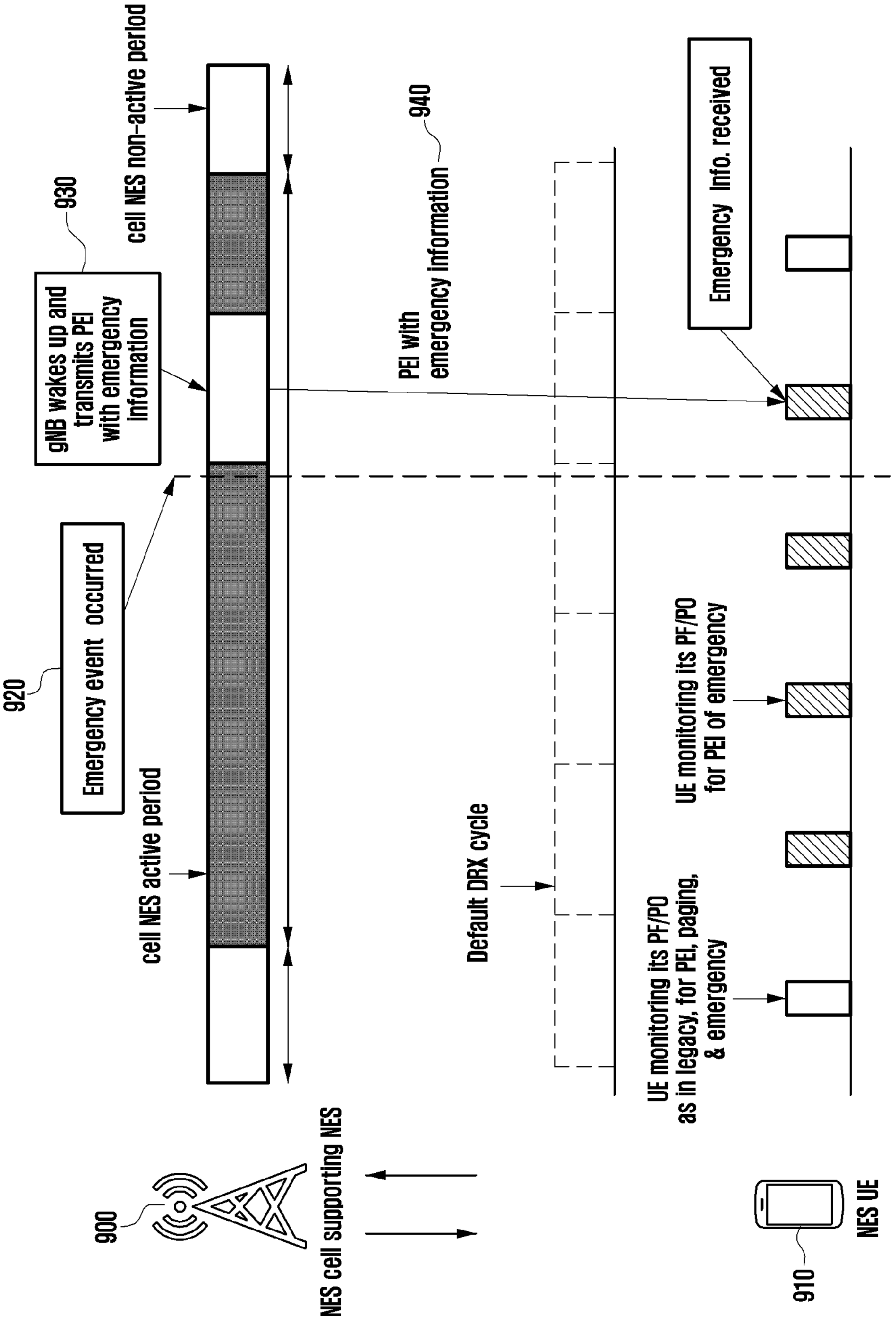
FIG. 9 illustrates a method for transmitting an emergency signal in a NES cell according to another embodiment of the disclosure.

Meanwhile, FIG. 9 illustrates a method for transmitting an emergency signal in an NES cell according to another embodiment of the disclosure. In FIG. 9, in case where a base station 900 operates in an NES mode, the base station 900 may configure a UE 910 supporting emergency signal reception as to which a paging early indication (hereinafter, PEI) to include and transmit emergency signal information. A corresponding configuration message may be transmitted by being included in any signal sent from the base station 900 to the UE 910, such as an RRC message, MAC message, or SIB message.

The PEI may include some or all of the following information.

The PEI may indicate to the UE that a corresponding PEI is only for emergency indication.

The PEI may include emergency information.

The PEI may include an indication indicating the presence of emergency information.

The PEI may provide emergency indication to the UE.

The PEI may indicate to the UE a certain/random DRX cycle in which it is scheduled to transmit a paging occasion for receiving emergency indication.

The PEI may indicate to the UE a certain/random DRX cycle in which it is scheduled to transmit a SSB reception resource for emergency indication reception and paging occasion.

The base station 900 may configure the UE 910 with a certain/random cycle to a certain/random default DRX cycle in order to receive a paging early indication even after the base station 900 enters the NES mode to receive an emergency signal. The base station may transmit to the UE an indication that informs the UE that the PEI may be transmitted in the default DRX cycle by including the indication in an RRC message, MAC message, or PHY message. The corresponding DRX cycle may be configured in the following form.

The default DRX cycle may be a new type of DRX cycle that is configured directly to have a certain period value (e.g., 20 ms) from a certain reference point, for example, SFN0 or SFN where the NES mode starts.

The default DRX cycle may be configured with an existing DRX Cycle indication and multiple to have a certain multiple of the existing DRX cycle.

The default DRX cycle may be configured and operated so that the UE attempts reception only in part of a certain existing DRX cycle. For example, the default DRX cycle may be configured and operated so that the UE receive in a DRX cycle that is counted from a DRX cycle starting at SFN0 or from a DRX cycle where the NES mode starts and multiplies even, odd, or a certain constant configured by the base station, for example, in a DRX Cycle in multiples of 3 if the base station configures 3.

Even in case where the base station 900 is operating in the NES mode, the base station 900 may recognize when an emergency event occurs and it is necessary to send an emergency signal to the UE 910. For example, the base station 900 may be able to receive information about the occurrence of the emergency signal from a core network even when operating in the NES mode, and for this, the communication module connected to the core network may not be turned off. When the base station 900 recognizes that an emergency event occurs while operating in the NES mode (920) and it is necessary to send an emergency signal to the UE 910, the base station 900 may wake up and send a corresponding emergency signal to the UE 910 during the default DRX cycle that immediately follows (930). For example, the base station 900 may transmit the PEI including emergency information to the UE 910. It is apparent that an emergency signal 940 may be transmitted to the UE 910 in the form of short data included in the PEI or paging signal following the PEI, or as a separate signal following the paging signal. In this way, when it is necessary to transmit an emergency signal to the UE 910, the base station 900 may wake up immediately and transmit the emergency signal, thereby enabling the UE 910 to receive the emergency signal without delay.

The base station may configure the UE with a DRX cycle, which is the period for receiving paging occasion even after the base station enters the NES mode to receive an emergency signal, to a certain default DRX cycle, and the corresponding DRX cycle may be configured in the following form.

The default DRX cycle may be a new type of DRX cycle that is configured directly to have a certain period value (e.g., 20 ms) from a certain reference point, for example, SFN0 or SFN where the NES mode starts.

The default DRX cycle may be configured with an existing DRX Cycle indication and multiple to have a certain multiple of the existing DRX cycle.

The default DRX cycle may be configured and operated so that the UE attempts reception only in part of a certain existing DRX cycle. For example, the default DRX cycle may be configured and operated so that the UE receive in a DRX cycle that is counted from a DRX cycle starting at SFN0 or from a DRX cycle where the NES mode starts and multiplies even, odd, or a certain constant configured by the base station, for example, in a DRX Cycle in multiples of 3 if the base station configures 3.

With reference to the drawings, the base station 900 may configure and use the DRX cycle for the UE 910 in various ways. For example, the base station 900 may start transmitting the PEI as soon as the UE wakes up and transmit the PEI until the configured DRX cycle immediately after is ended, and the base station 900 may start transmitting the PEI as soon as the UE wakes up and continue to transmit the PEI only for the length of the DRX cycle.

In an embodiment, the base station 900 may transmit an emergency signal to the UE 910 and then return to the NES mode to save power.

In another embodiment, the base station 900 may wake up after transmitting an emergency signal to the UE 910 and operate in an NES non-active mode.

It is apparent that the UE described in the disclosure may select whether to use or not to receive an emergency signal depending on the UE or user's selection. It is apparent that, in case where the UE uses emergency signal reception by selection of the UE or user, the UE may include the emergency signal reception in the UE's competency information or capability information and provide the capability information to the base station when the base station requests the capability information.

According to an embodiment of the disclosure, a method for a terminal to trigger an event for saving a certain power may include performing a communication connection with a first base station, receiving, from the first base station, location and location-based threshold information of adjacent base stations including the first base station, performing, by a terminal, a certain event, for example, an event that determines whether the terminal is in a center of a cell, for example, an event that determines that a mobility of the terminal is at or below a certain level, etc., based on the information, and performing a certain power saving mechanism, for example, relaxing a measurement period of a reference signal or stopping the measurement of the reference signal in case where a condition of the certain event is satisfied.

Figure 10:
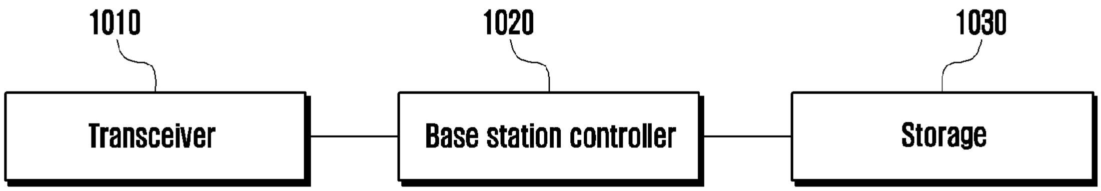
FIG. 10 illustrates a structure of a base station according to an embodiment of the disclosure.

FIG. 10 illustrates a structure of a base station according to an embodiment of the disclosure.

With reference to FIG. 10, the base station may include a transceiver 1010, a controller 1020, and a storage 1030. The transceiver 1010, controller 1020 and storage 1030 may operate according to the above-described base station communication method. In addition, a network device may also correspond to the structure of the base station. However, the components of the base station are not limited thereto. For example, the base station may include more or fewer components than those described above. For example, the base station may include the transceiver 1010 and the controller 1020. In addition, the transceiver 1010, controller 1020, storage 1030 may be implemented as a single chip.

A receiver of the base station and transmitter of the base station may be collectively referred to as the transceiver 1010, and the transceiver 1010 may transmit and receive a signal with a terminal, another base station or another network devices. In this case, the signal to be transmitted and received may include control information and data. For example, the transceiver 1010 may transmit system information to the terminal and may transmit a synchronization signal or reference signal. To this end, the transceiver 1010 may include a RF transmitter for up-converting and amplifying a frequency of signals to be transmitted, an RF receiver for low-noise-amplifying received signals and down-converting a frequency of received signals, and the like. However, this is merely an example of the transceiver 1010, and thus components of the transceiver 1010 are not limited to the RF transmitter and RF receiver. The transceiver 1010 may include a wired or wireless transceiver and may include various components for transmitting and receiving signals. In addition, the transceiver 1010 may receive a signal through a communication channel (e.g., a wireless channel) and output the signal to the controller 1020, and transmit the signal output from the controller 1020 through the communication channel. In addition, the transceiver 1010 may receive a communication signal, output the communication signal to a processor, and transmit the signal output from the processor to the terminal, another base station, or another entity through a wired or wireless network.

The storage 1030 may store programs and data necessary for operations of the base station. In addition, the storage 1030 may store control information or data which is included in a signal obtained by the base station. The storage 1030 may be constituted as a storage medium including a ROM, a RAM, a hard disk, a CD-ROM, a DVD, or the like, or a combination of the storage media. In addition, the storage 1030 may store at least one of information transmitted and received through the transceiver 1010 and information generated through the controller 1020.

In the disclosure, the controller 1020 may be defined as a circuit, an application-specific integrated circuit, or at least one processor. The processor may include a communication processor (CP) that performs control for communication and an application processor (AP) that controls an upper layer such as an application program. The controller 1020 may control the overall operation of the base station according to the embodiment provided in the disclosure. For example, the controller 1020 may control signal flows between respective blocks so as to perform operations according to the flowcharts described above. According to an embodiment of the disclosure, the controller 1020 may identify that an emergency event has occurred while operating in an NES mode. The controller 1020 may prepare to transmit an emergency signal and control the emergency signal to be transmitted at any time.

Figure 11:
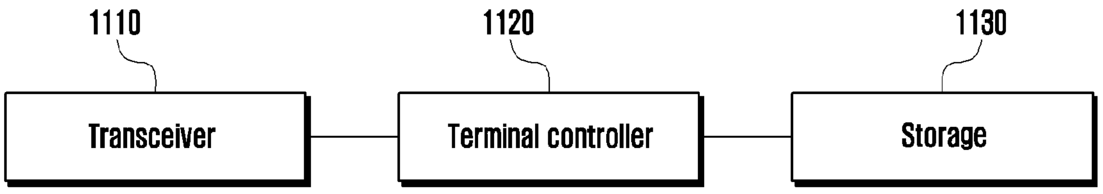
FIG. 11 illustrates a structure of a terminal according to an embodiment of the disclosure.

FIG. 11 illustrates a structure of a terminal according to an embodiment of the disclosure.

With reference to FIG. 11, the terminal may include a transceiver 1110, a controller 1120, and a storage 1130. The transceiver 1110, controller 1120 and storage 1130 may operate according to the above-described terminal communication method. However, the components of the terminal are not limited thereto. For example, the terminal may include more or fewer components than those described above. For example, the terminal may include the transceiver 1110 and the controller 1120. In addition, the transceiver 1110, controller 1120, storage 1130 may be implemented as a single chip.

A receiver of the terminal and transmitter of the terminal may be collectively referred to as the transceiver 1110, and the transceiver 1110 may transmit and receive a signal with a base station, another terminal or another network entity. The signal to be transmitted and received to and from the base station may include control information and data. For example, the transceiver 1110 may receive system information to the base station and may receive a synchronization signal or reference signal. To this end, the transceiver 1110 may include a RF transmitter for up-converting and amplifying a frequency of signals to be transmitted, an RF receiver for low-noise-amplifying received signals and down-converting a frequency of received signals, and the like. However, this is merely an example of the transceiver 1110, and thus components of the transceiver 1110 are not limited to the RF transmitter and RF receiver. In addition, the transceiver 1110 may include a wired or wireless transceiver and may include various components for transmitting and receiving signals. In addition, the transceiver 1110 may receive a signal through a wireless channel and output the signal to the controller 1120 and transmit the signal output from the controller 1120 through the wireless channel. In addition, the transceiver 1110 may receive a communication signal, output the communication signal to a processor, and transmit the signal output from the processor to the network entity through a wired or wireless network.

The storage 1130 may store programs and data necessary for operations of the terminal. In addition, a memory may store control information or data which is included in a signal obtained by the terminal. The storage 1130 may be constituted as a storage medium including a ROM, a RAM, a hard disk, a CD-ROM, a DVD, or the like, or a combination of the storage media.

In the disclosure, the controller 1120 may be defined as a circuit, an application-specific integrated circuit, or at least one processor. The processor may include a communication processor (CP) that performs control for communication and an application processor (AP) that controls an upper layer such as an application program. The controller 1120 may control the overall operation of the terminal according to the embodiment provided in the disclosure. For example, the controller 1120 may control signal flows between respective blocks so as to perform operations according to the flowcharts described above. According to an embodiment of the disclosure, the controller 1120 may control the transceiver 1110 to receive the configurations for transmitting an emergency signal in an NES cell from the base station. The controller 1120 may control to receive an emergency signal at any time.

The methods according to the embodiments described in the claims or specification of the disclosure may be implemented in the form of hardware, software or a combination of hardware and software.

In case where the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the disclosure described in the specification or the claims.

These programs (software modules or software) may be stored in a random access memory, nonvolatile memories including flash memory, read only memory (ROM), electrically erasable programmable read only memory (EEPROM), magnetic disc storage device, compact disc-ROM (CD-ROM), digital versatile discs (DVDs), other types of optical storage devices, or magnetic cassette. Also, the programs may be stored in a memory configured by a combination of some or all of such storage devices. Also, each of the constitute memories may be provided in plurality.

Also, the programs may be stored in an attachable storage that may be accessed through a communication network such as Internet, Intranet, local area network (LAN), wide LAN (WLAN), or storage area network (SAN), or through a communication network configured by any combination thereof. Such a storage device may be connected through an external port to an apparatus performing an embodiment of the disclosure. Also, a separate storage on a communication network may be connected to an apparatus performing an embodiment of the disclosure.

In the above particular embodiments of the disclosure, the components included in the disclosure are expressed in the singular or plural according to the presented particular embodiments of the disclosure. However, the singular or plural expressions are selected suitably according to the presented situations for convenience of description, the disclosure is not limited to the singular or plural components, and the components expressed in the plural may even be configured in the singular or the components expressed in the singular may even be configured in the plural.

Meanwhile, in the detailed description of the disclosure, specific embodiments have been described, but it is apparent that various modifications are possible without departing from the scope of the disclosure. Therefore, the scope of the disclosure should not be limited to the described embodiments, but should be determined not only by the scope of the claims described later, but also by the equivalent scope of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a base station in a wireless communication system, the method comprising:

transmitting, to a terminal, a message including configuration information for transmitting an emergency signal associated with a network energy saving (NES) mode;

determining whether a predetermined emergency event is detected during an NES active period in case that a cell operates in the NES mode, wherein a paging message is not transmitted during the NES active period; and transmitting, to the terminal, the emergency signal by switching the NES active period to an NES non-active period, in case that the predetermined emergency event is detected during the NES active period.

2. The method of claim 1, wherein a paging occasion is monitored by the terminal during an idle mode according to a cycle determined based on the configuration information.

3. The method of claim 1, further comprising:

determining whether to wake up for transmitting the emergency signal in case that the predetermined emergency event is detected.

4. The method of claim 1, wherein the emergency signal is transmitted during a next cycle in an NES non-active mode.

5. The method of claim 4, further comprising:

switching an operation mode from the NES non-active mode to an NES active mode after transmitting the emergency signal during the next cycle.

6. The method of claim 1, further comprising:

receiving, from a core network entity, information associated with the predetermined emergency event, wherein the predetermined emergency event is detected in case that the information associated with the predetermined emergency event is received.

7. A method performed by a terminal in a wireless communication system, the method comprising:

receiving, from a base station, a message including configuration information for receiving an emergency signal associated with a network energy saving (NES) mode; and receiving, from the base station associated with a cell operating in the NES mode, the emergency signal in case that a predetermined emergency event is detected by the base station during an NES active period, wherein a paging message is not transmitted during the NES active period, and wherein the emergency signal is transmitted, by the base station, by switching the NES active period to an NES non-active period.

8. The method of claim 7, wherein the configuration information includes at least one of information associated with a paging occasion, or information associated with a cycle for monitoring the paging occasion.

9. A base station in a wireless communication system, the base station comprising:

a transceiver; and at least one processor operably coupled to the transceiver, the at least one processor configured to:

transmit, to a terminal via the transceiver, a message including configuration information for transmitting an emergency signal associated with a network energy saving (NES) mode, determine whether a predetermined emergency event is detected during an NES active period in case that a cell operates in the NES mode, wherein a paging message is not transmitted during the NES active period, and transmit, to the terminal via the transceiver, the emergency signal by switching the NES active period to an NES non-active period, in case that the predetermined emergency event is detected during the NES active period.

10. The base station of claim 9, wherein a paging occasion is monitored by the terminal during an idle mode according to a cycle determined based on the configuration information.

11. The base station of claim 9, wherein the at least one processor is further configured to:

determine whether to wake up for transmitting the emergency signal in case that the predetermined emergency event is detected.

12. The base station of claim 9, wherein the emergency signal is transmitted during a next cycle in an NES non-active mode.

13. The base station of claim 12, wherein the at least one processor is further configured to:

switch an operation mode from the NES non-active mode to an NES active mode after transmitting the emergency signal during the next cycle.

14. The base station of claim 9, wherein the at least one processor is further configured to:

receive, from a core network entity, information associated with the predetermined emergency event, wherein the predetermined emergency event is detected in case that the information associated with the predetermined emergency event is received.

15. A terminal in a wireless communication system, the terminal comprising:

a transceiver; and at least one processor operably coupled to the transceiver, the at least one processor configured to:

receive, from a base station via the transceiver, a message including configuration information for receiving an emergency signal associated with a network energy saving (NES) mode, and receive, from the base station associated with a cell operating in the NES mode, the emergency signal in case that a predetermined emergency event is detected by the base station during an NES active period, wherein a paging message is not transmitted during the NES active period, and wherein the emergency signal is transmitted, by the base station, by switching the NES active period to an NES non-active period.

16. The terminal of claim 15, wherein the configuration information includes at least one of information associated with a paging occasion, or information associated with a cycle for monitoring the paging occasion.

17. The method of claim 1, wherein the configuration information includes at least one of information associated with a paging occasion, or information associated with a cycle for monitoring the paging occasion.

18. The base station of claim 9, wherein the configuration information includes at least one of information associated with a paging occasion, or information associated with a cycle for monitoring the paging occasion.

* * * * *